United States Patent [19]
Fischer

[11] 3,815,467
[45] June 11, 1974

[54] ANCHORING ASSEMBLY

[76] Inventor: Artur Fischer, Altheimer Strasse 219, Tumlingen, Germany

[22] Filed: June 16, 1972

[21] Appl. No.: 263,429

[30] Foreign Application Priority Data
July 15, 1971 Germany.............................. 2135333

[52] U.S. Cl. ..................................... 85/77, 248/217
[51] Int. Cl. ............................................. F16b 13/06
[58] Field of Search ............... 85/76, 75, 74, 79, 77, 85/73, 84, 83, 82, 1 F, 28, 11; 248/217, 216

[56] References Cited
UNITED STATES PATENTS

| | | | |
|---|---|---|---|
| 352,226 | 11/1886 | Courtney............................... | 85/77 |
| 525,222 | 8/1894 | Levering................................ | 85/75 |
| 937,984 | 10/1909 | Brown............................. | 248/216 X |
| 1,120,411 | 12/1914 | Rohmer................................. | 85/74 |
| 1,146,651 | 7/1915 | Raeger.................................. | 85/84 |
| 1,234,487 | 7/1917 | Raeger.................................. | 85/83 |
| 2,117,833 | 5/1938 | Wellner........................... | 85/79 UX |
| 3,710,674 | 1/1973 | Tabor.................................... | 85/84 |

FOREIGN PATENTS OR APPLICATIONS

534,433   1/1955   Bulgaria................................ 85/77

*Primary Examiner*—Ramon S. Britts
*Attorney, Agent, or Firm*—Michael S. Striker

[57] ABSTRACT

An anchoring assembly has an expansion sleeve having a longitudinal slot. An expansion body having a tapered portion made from a sheet metal bar which is in the form of a wave having crests of diminishing size towards the front of the expansion body, is engageable in the slot when the sleeve is forced onto the expansion body. At a point on the expansion body where the tapered portion has its narrowest dimension, the expansion body has an abutment means to limit penetration of the body into a hole and also has an outwardly projecting supporting portion.

8 Claims, 5 Drawing Figures

PATENTED JUN 11 1974　　　　　　　　　　　　　　　　　　　　3,815,467
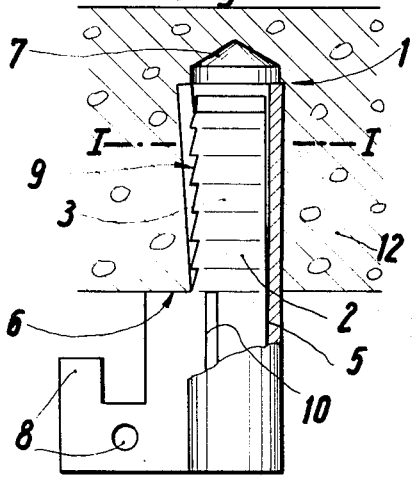
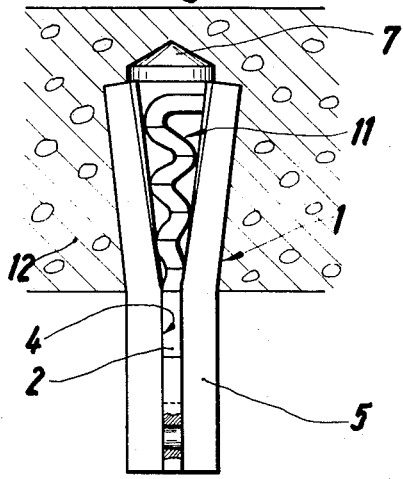
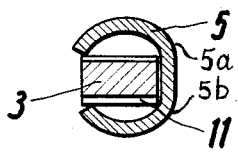
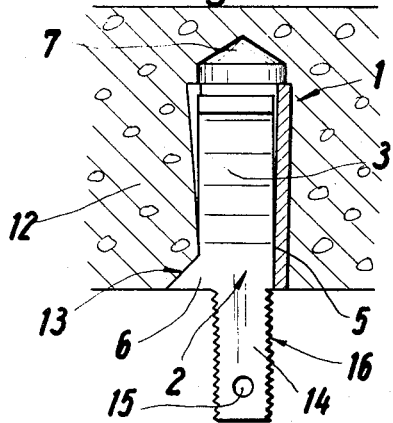
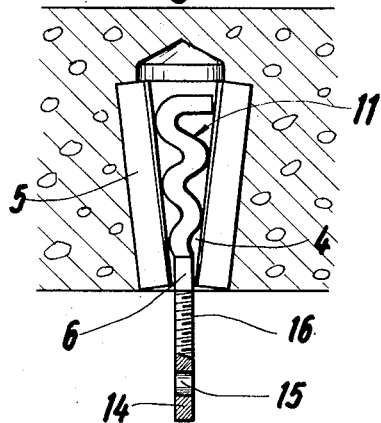

ANCHORING ASSEMBLY

BACKGROUND OF THE INVENTION

The present invention relates to anchoring elements, and particularly to an anchoring assembly which has an expansion sleeve and which is useful for connecting elements to, or suspending them from, a surface.

Anchoring means for connecting elements to, or suspending them from, a surface are already known. Thus, it is known to anchor suspended ceilings, pipes and the like in surfaces by use of anchoring elements. For example, it is well known that to attach wires, perforated strips and the like or for the purpose of fixing pipes and suspended ceilings, affixing elements have hitherto been used which are anchored in drill holes in ceiling or roof constructions by turning a fastening screw into a conical bore or by drawing an expansion body into the expansion part of the fixing element. In order to be effectively anchored, such fixing elements must have a certain length. In roof constructions of reinforced concrete, however, the distance from the lower roof edge to the embedded reinforcing steel is normally only 1.5 to 2 centimeters. This small space does not permit the use of the conventional fixing elements for the fixing of pipes and suspended ceilings in the case of reinforced concret roofs. Moreover, anchoring fixing elements in roof constructions by screwing in a fastening screw is very time-consuming.

It has, therefore, been proposed to fire bolts into the roof and to attach to the fired-in bolts devices to which the perforated strips and wires may be attached. In addition to the dangers arising from the firing of such bolts, the retaining forces achieved thereby are, in many cases, not sufficient. Moreover, there is the necessity of attaching additional devices to the fired-in bolts for fastening the perforated strips and wires.

Also known are fixing elements which require the presence of the base of the bore as a constructional element for the expansion. These consist of an expansion body resting upon the base of the bore, onto which the expansion body and expansion sleeve may be driven. In most cases, the expansion body also contains a central threaded bore, into which hooks, eyes and the like may be screwed for the fastening of the perforated strips and wires. These types of fixing elements, however, have the disadvantage that they require bores, the depth of which must be accurately observed.

SUMMARY OF THE INVENTION

Accordingly, it is an object of the present invention to provide an anchoring assembly which does not have the disadvantages known in the prior art for such assemblies.

It is another object of the present invention to provide an anchoring assembly which is simple in construction and economical to manufacture and which provides a fixing element that, on the one hand, can be anchored simply and rapidly and, on the other hand, resists very high extraction forces.

It is a further object of the present invention to provide an anchoring assembly of the type under discussion which may be utilized with holes which are drilled too deeply or, respectively, in through holes.

It is still a further object of the present invention to provide an anchoring assembly which resists very high extraction forces, even when the length of anchoring in the reinforced concrete is very small.

With the above objects in view, the present invention or an anchoring assembly suitable for engagement with a hole in a relatively hard surface for suspending an element from a ceiling, comprises an expansion sleeve having a longitudinal slot. An expansion body is provided which cooperates with said expansion sleeve and which comprises a tapered portion tapering in direction towards the front end of said body. The expansion body is arranged to engage said slot so as to expand said expansion sleeve upon engagement therewith when the latter is forced onto the former in the direction of increasing engaging dimensions of said expansion body. Said expansion sleeve and body are arranged to be inserted into a hole so that upon expansion of said expansion sleeve the same engages the interior surface of the hole to thereby attach the anchoring assembly to the hard surface.

In accordance with the presently preferred embodiment, said expansion body further comprises, spaced from the front end thereof, abutment means adapted to abut against the surface to thereby limit the extent of penetration of said expansion body into the hole. In accordance with an additional feature of the invention, the expansion body further comprises an outwardly projecting supporting portion connected to said tapered portion for having elements connected thereto when said expansion sleeve and body are engaged inside the hole.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 is a side view of an anchoring assembly in accordance with the present invention, partly in cross-section, showing the anchoring assembly anchored in a concrete ceiling;

FIG. 2 is a front view of the anchoring assembly shown in FIG. 1;

FIG. 3 is a cross-section of the anchoring assembly shown in FIG. 1 taken at line I—I;

FIG. 4 is a side view, partly in cross-section, showing another embodiment of the anchoring assembly; and FIG. 5 is a front view of the anchoring assembly shown in FIG. 4.

DETAILED DESCRIPTION OF THE PREFERRED EMBODIMENTS

Referring now to the drawings, where similar reference numerals have been utilized to identify similar parts throughout, and first referring to FIGS. 1 to 3, the anchoring assembly or fixing element 1 comprises an internal element or expansion body 2. The expansion body 2 has a tapered portion or expansion part 3 which tapers towards the front of the expansion body 2, i.e., the portion projecting from the surface. In the presently preferred embodiment, the expansion part 3 is manufactured from a flat sheet metal bar and is provided with waves having crests of diminishing size towards the front of the expansion body. Thus, the width of the expansion parts increases in the direction of the rear or insertion end of the expansion body 2 so as to define a wedge. The anchoring assembly also comprises an expansion sleeve 5 which has a longitudinal slot 4. The tapered expansion part 3 has a width which is greater than the inside diameter of the expansion sleeve 5 so that at least a portion of the tapered expansion part 3 extends into the slot 4.

The expansion body 2, intermediate to the front end and the expansion part 3, is provided with abutment means or a stop element 6 for preventing excessive ingress of the expansion body 2 into a drill hole 7 when the expansion sleeve 5 is driven in. Forming the front end of expansion body 2, are projecting supporting portions 8, such as hooks, bores, thread sections and the like, for attaching a support element uch as perforated strips, wire, etc.

In the embodiment shown, a lateral edge 9 of the expansion part 3 is serrated. The expansion sleeve 5 is preferably a spring sleeve which has a continuous slot 4.

Although the expansion part 3 has been described as being wave shaped, the present invention contemplates other forms of the tapered portions. The only requirement for the shape of the expansion part 3 is that it be tapered from the rear end towards the front end and that at least the portion of the expansion part 3 which extends into the slot 4 be so tapered.

The expansion body 2 may also be provided with a projection or guide means 10 which extends from the front of the expansion body 2 up to the expansion part 3. The projection 10 projects a distance to each side of the expansion body 2 so that the two outwardly projecting edges of the projection 10 are spaced a distance approximately equal to the inside diameter of the expansion sleeve 5. Thus, the expansion sleeve 5 embraces the projections 10 from the outside and is guided thereby when it is driven onto the expansion body 2.

The cross-section of the expansion part 3 of the expansion body 2, together with the wall thickness of the expansion sleeve 5, together approximately equal the diameter of the drill hole 7. Thus, from the beginning of the driving of the expansion sleeve 5 onto the expansion body 2, the expansion body 2 is guided in the drill hole while being prevented from tilting.

In FIG. 3, the wave shape 11 of the expansion part 3 of the expansion body 2 is illustrated. When the expansion sleeve 5 is driven in, the expansion part 3 expands the expansion sleeve in the form of a wedge and thus anchors the fixing element 1 in the roof construction 12.

Referring to FIGS. 4 and 5, these show another embodiment of the present invention. Here again, the tapered expansion part 3 is wave-shaped and is stamped out from flat sheet metal. In this embodiment, however, the abutment element 6 is configured to be triangular in shape, the beveled edge 13 of the abutment element 6 pointing in the direction of the insertion end. This causes the abutment element 6 to disappear in the roof construction 12 when the expansion sleeve 5 is driven onto the expansion body 2 so that a flush assembly of fixing element 1 is possible. When the fixing element 1 has been fitted, the shank 14 of the expansion body 2 protrudes over the expansion sleeve 5, which shank contains means for attaching support elements such as wires, perforated strips and the like. In the example shown, this is indicated by a bore 15 and a thread 16.

The lateral view, shown in FIG. 5, shows the undulatory construction 11 of the expansion part 3 and the abutment element 6 arranged as the expansion body 2 in the region of the longitudinal slot 4 of the expansion sleeve 5.

Thus, according to the invention, the expansion body 2 is provided with a tapered expansion part 3 which engages the longitudinal slot 4 of the expansion sleeve 5 and thus widens the expansion sleeve. As can best be seen in FIG. 3, expansion sleeve 5 has two sleeve portions, 5a and 5b, which behave as apparent pivot points about which the lateral sides of sleeve 5 expand. As the width of the tapered expansion part 3 increases, the expansion part 3 exerts outward forces on the opposite faces of the slot 4 by reason of being wedged therein. The outward forces on the slot surfaces cause the lateral sides of the expansion sleeve 5 to move outwardly about the sleeve portions 5a and 5b to thereby continually expand the sleeve 5 as it is forced onto the expansion part 3. However, because the expansion sleeve 5 only experiences the outward forces in the region of the slots, the expansion process requires small forces applied to the expansion sleeve 5 while the expansion part 3 engages the latter. Otherwise, greater forces would be required if the expansion part 3 were to make contact with the expansion sleeve over the substantial interior surface of the latter.

To anchor the fixing element according to the invention, a hole 7 is drilled in the roof structure 12, into which hole the expansion body 2 is inserted until the abutment element 6 limits the depth of penetration and is in contact with the lower edge of the roof. The abutment element prevents further ingress of the expansion body 2 into the drill hole 7 when the expansion sleeve 5 is driven in by being forced onto the tapered expansion part 3, and thus permits the anchoring of the fixing element 1 in drill holes regardless of the depth or the length of the hole. The use of an abutment element 6, therefore, makes the anchoring assembly suitable for use with drill holes which are drilled too deeply or in through holes.

One lateral edge of the expansion body in the region thereof engaging the longitudinal slot 4 of the expansion sleeve 5 is pressed against the interior wall of the drill hole 7, while the gap between the opposite lateral edge and the interior wall of the drill hole is filled by the expansion sleeve 5. This provides a guide through the drill hole 7 for the expansion body 2 as well as for the expansion sleeve 5, which prevents tilting of the expansion body 2 when the expansion sleeve 5 is driven in.

When a part of the expansion body 2 engages the longitudinal slot, the expansion sleeve is widened. The engagement of the slot with the tapered expansion part 3 produces a pressure load on the expansion sleeve 5, as described above, which increases rapidly in the region of the longitudinal slot 4 and is then distributed uniformly over the entire periphery of the expansion sleeve 5. This uniform pressure distribution provides very high retaining values in concrete, because the entire surface of the expansion sleeve 5 is pressed against the wall of the drill hole at almost the same contact pressure. The entire surface of the expansion sleeve 5 thus acts as a friction face while, in contrast, in the known fixing elements which are provided with a slit from the front end and are expanded by the screwing-in of a fastening screw, only a small part of the peripheral surface can serve as a friction face. In this case, the pressure distribution is such that, starting from the longitudinal slots, the pressure increases very slowly to reach its highest value in the middle of the two half-shells. This kind of pressure distribution leads to elliptical deformation of the known fixing elements in the drill hole, almost the entire retaining force of these fixing elements deriving from the friction of the surface part loaded with the highest pressure value only.

It is possible to provide the expansion sleeve with two longitudinal slots, one of which may be continuous. In this case, too, the pressure distribution is still very favorable.

To great advantage, in the presently preferred embodiment, the expansion sleeve is a spring sleeve which is provided with a continuous longitudinal slot. The spring sleeve can be made from a rigid resilient material, such as spring steel. By using a spring sleeve as an expansion sleeve, two advantages are derived for the anchoring of the fixing element. The first advantage is the intrinsic tension force which a spring sleeve-type expansion sleeve affords. Also, widening or permanent deformation is not common with a spring sleeve so that the latter do not so widen when forced onto the expansion part of the expansion body 2 engaging the longitudinal slot 4 of the expansion sleeve 5. These two factors provide retaining values which far exceed the retaining values obtainable by means of known fixing elements. Additionally, spring sleeves can be manufactured very cheaply and simply by continuous processes. They obtain their elasticity and high resistance of their surface to were by surface hardening.

In a further development of the invention, the abutment element 6 of the expansion body may be arranged in the region of the longitudinal slot of the expansion sleeve 5 and be in contact with the concrete in the region of the mouth of the drill hole 7. The abutment element 6 prevents further ingress of the expansion body 2 into the drill hole 7 when the longitudinally slotted expansion sleeve 5 is driven in. The arrangement of the abutment element in the region of the longitudinal slot 4 of the expansion sleeve 5 has the advantage that an expansion sleeve 5 may be used, the length of which corresponds to the length of the expansion body 2 and which can be pushed over the abutment element 6 for driving onto the expansion body 2.

In another development of the invention, the means for attaching support elements such as wires, perforated strips and the like may be arranged at the abutment element 6. This solution permits strips and wires required for suspending pipes and ceilings to be attached after the anchoring of the fixing elements. Moreover, the hooks and bores arranged at the abutment element 6 are easily accessible and thus facilitate the assembly. As described above, the abutment element may be triangular. When drilling the drill hole 7 for the fixing element 1 according to the invention, a conical break-off of the mouth of the drill hole cannot always be prevented. By constructing the abutment element 6 as a triangular fin whose beveled edge points in the direction of the insertion end of the expansion body 2, the stop element is brought into contact with the mouth cone of the drill hole instead of the lower edge of the roof. The abutment element 6 thus reaches so far into the drill hole that it does not protrude over the lower roof edge, so that flush assembly is possible.

The tapered expansion part 3 may, as described above, consist of a sheet metal bar, at least the part engaging the longitudinal slot of the expansion sleeve 5 having a wave shape. This construction permits it to be manufactured in a simple manner from a sheet metal bar of uniform thickness. The thickness of the tapered expansion part 3, as well as the hardness of the material, must be so selected so that it can withstand the substantially high stresses which are applied thereto by the longitudinal slot 4 as the expansion sleeve 5 is forced thereon. As described above, the actual shape of the tapered expansion part 3 is not critical, it only being necessary that a tapered portion be provided on the extension body 2 which engages with the longitudinal slot 4 and is tapered towards the front of the expansion body.

The projection 10, for the guidance of the expansion sleeve 5 may be arranged in the region of the abutment element 6. Of course, it is also possible to arrange bars instead of projections. These devices serve for guiding the expansion sleeve 5 in the region of its slot.

Referring to FIGS. 4 and 5, as described above, the part of the expansion body protruding from the expansion sleeve after anchoring may be provided with a thread. Since normally the expansion body 2 is manufactured from a sheet metal bar, the shank protruding from the expansion sleeve 5 has a reactangular-cross section. Only the lateral edges of the shank 14 are thus provided with threads 16.

It may be expedient, for example, when a complete thread is required, to manufacture the expansion body 2 from a round section. The part engaging the longitudinal slot of the expansion sleeve 5 and the abutment element 6 may be stamped in a simple manner from the solid section. For mass production it is economical to produce such a section itself by a suitable process, for example, by extrusion. In order to form the thread, the flat rim is removed from the shank protruding from the expansion sleeve.

It is also possible to leave out the shank protruding from the expansion sleeve 5 and having an exterior thread, and to provide instead the expansion body 2 with an internal thread into which a stay bolt is then screwed. This has the advantage that the expansion sleeve may be hammered directly in order to anchor the fixing element, and additional auxiliary tools are not required for the driving-in.

Referring to FIGS. 1 and 2, the expansion sleeve 5 has a length which is substantially equal to the length of the expansion body 2. With this embodiment, after the expansion body 2 is placed into the hole 7, the expansion sleeve 5 is slid over the lower portion of the expansion body 2 so that the same engages the slot 4. The expansion sleeve 5 is then advanced toward the expansion part 3 until it meets the resistance of both the expansion part 3 as well as the concrete roof 12. At such time, the expansion sleeve 5 is forced onto the expansion part 3, by hammering. The hammering continues until the expansion sleeve 5 is fully forced onto the expansion part 3, as shown in FIGS. 1 and 2. On the other hand, with the embodiment of FIGS. 4 and 5, where the expansion sleeve is not as long as the expansion body 2, a special tool may be necessary for hammering in the expansion sleeve 5 to positions shown in FIGS. 4 and 5. Such a tool may consist of a cylindrical shell which is approximately equal in diameter to the diameter of the expansion sleeve 5. By placing the tool over the shank 14 so that it engages the lower edge of the expansion sleeve 5, the latter may be hammered in by hammering the shell until full insertion of the expansion sleeve 5 is achieved. At such time, the shell may be withdrawn and the shank 14 remains projecting below the roof surface.

The present invention results in an anchoring assembly which offers a high resistance to withdrawal after insertion as described above. Thus, by providing the support element with the tapered expansion part 3, any downward forces which are applied by the weight of the suspended components, have the tendency to further expand the already expanded upper portions of the expansion sleeve 5 by virtue of the tapered configuration of the expansion part 3. Thus, as will best be seen from FIGS. 2 and 5, any downward movement of the expansion body 2, together with the tapered expansion part 3, would tend to further expand the expansion sleeve 5 to thereby better secure the anchoring assembly in the roof.

It will be understood that each of the elements described above, or two or more together, may also find a useful application in other types of anchoring assemblies differing from the types described above.

While the invention has been illustrated and described as embodied in an anchoring assembly having an expansion body and an expansion sleeve for the mounting of components to hard surfaces, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. An anchoring assembly to be expanded in a hole of a supporting structure, comprising an expansion sleeve having a longitudinal slot; and an elongated expansion body at least in part received in said expansion sleeve and comprising a front portion provided with attachment means for a structural element to be attached to the supporting structure, and a rear portion adjacent said front end portion and comprising a lateral portion extending into said slot, at least said lateral portion comprising an undulated cross-section defining a plurality of waves extending transversely of the elongation of said body and having crests the height of which converges in the direction toward said front portion, and said slot being widened by said waves in response to requisite axial displacement of said sleeve and said body relative to one another so that the outer surface of said sleeve assumes a substantially conical shape and wedgingly engages the interior surface bounding the hole.

2. An anchoring assembly as defined in claim 1, wherein said rear end portion has a width parallel to said crests, and wherein said waves extend over the entire width of said rear end portion.

3. An anchoring assembly as defined in claim 1, further comprising at the rear end of said expansion sleeve abutment means adapted to abut against the surface of the supporting structure to thereby limit the extent of penetration of said expansion sleeve into the hole.

4. An anchoring assembly as defined in claim 1, further comprising an outwardly projecting supporting portion connected to the rear end of said expansion sleeve for having elements connected thereto when said expansion sleeve and body are engaged inside the hole.

5. An anchoring assembly as defined in claim 1, wherein said expansion sleeve is a spring sleeve the longitudinal slot of which extends the entire length thereof.

6. An anchoring assembly as defined in claim 2, wherein said abutment means projects beyond said slot when said sleeve is forced onto said expansion body.

7. An anchoring assembly as defined in claim 2, wherein said abutment means is triangular in shape and has a sloping edge inclined to and another edge transverse to the length of said expansion body.

8. An anchoring assembly as defined in claim 1, wherein successive crests of said rear portion have heights which gradually increase in a direction transverse to the length of said expansion body away from said front end.

* * * * *